US010569426B2

(12) United States Patent
Komatsu et al.

(10) Patent No.: US 10,569,426 B2
(45) Date of Patent: Feb. 25, 2020

(54) ROBOT HAND JIG AND ROBOT

(71) Applicant: Seiko Epson Corporation, Tokyo (JP)

(72) Inventors: Daisuke Komatsu, Suwa (JP); Sota Yamamoto, Matsumoto (JP); Ryuichi Okada, Matsumoto (JP); Fumiaki Hasegawa, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/110,053

(22) Filed: Aug. 23, 2018

(65) Prior Publication Data

US 2019/0061176 A1    Feb. 28, 2019

(30) Foreign Application Priority Data

Aug. 24, 2017  (JP) ................................. 2017-160891
Jun. 8, 2018   (JP) ................................. 2018-110205

(51) Int. Cl.
    *B25J 15/10*    (2006.01)
(52) U.S. Cl.
    CPC .................. *B25J 15/103* (2013.01)
(58) Field of Classification Search
    CPC ........................................................ B25J 15/103
    USPC ............... 294/119.1, 116, 207; 901/2, 41
    See application file for complete search history.

(56) References Cited

U.S. PATENT DOCUMENTS

| 4,273,506 A * | 6/1981 | Thomson ................ B25J 9/046 |
| | | 294/106 |
| 4,676,541 A * | 6/1987 | Lord .................... B25J 15/0475 |
| | | 294/119.1 |
| 8,408,619 B2 * | 4/2013 | Murakami ............... B25J 15/10 |
| | | 294/119.1 |
| 8,684,432 B2 * | 4/2014 | Saka ....................... B25J 15/08 |
| | | 294/119.1 |
| 8,752,874 B2 * | 6/2014 | Murakami ............. B25J 15/026 |
| | | 294/119.1 |
| 8,794,685 B2 * | 8/2014 | Murakami ............... B25J 15/10 |
| | | 294/119.1 |
| 2006/0012197 A1 * | 1/2006 | Anderson ............ B25J 15/0009 |
| | | 294/106 |
| 2008/0023925 A1 * | 1/2008 | Tomita ............. B23B 31/16004 |
| | | 279/47 |
| 2012/0286535 A1 | 11/2012 | Murakami et al. |
| 2015/0234375 A1 * | 8/2015 | Takayama .......... G05B 19/4086 |
| | | 700/187 |
| 2016/0089788 A1 * | 3/2016 | Nammoto ............. B25J 9/1633 |
| | | 700/250 |

(Continued)

FOREIGN PATENT DOCUMENTS

JP    2012-236247 A    12/2012
JP    2017-100195 A    6/2017

*Primary Examiner* — Paul T Chin
(74) *Attorney, Agent, or Firm* — Harness, Dickey & Pierce, P.L.C.

(57) ABSTRACT

A robot hand jig includes a grip including a first depression configured to engage with a first finger and a second depression configured to engage with a second finger. The first depression includes a first surface, a second surface perpendicular to the first surface, a third surface perpendicular to the second surface, and a fourth surface perpendicular to the first surface and the second surface. The second depression includes a fifth surface, a sixth surface perpendicular to the fifth surface, a seventh surface perpendicular to the sixth surface, and an eighth surface perpendicular to the fifth surface and the sixth surface.

12 Claims, 14 Drawing Sheets

(56) References Cited

U.S. PATENT DOCUMENTS

2019/0270207 A1\* 9/2019 Motowaki .............. B25J 15/103

\* cited by examiner

ROBOT HAND JIG AND ROBOT

BACKGROUND

1. Technical Field

The present invention relates to a robot hand jig and a robot.

2. Related Art

In a manufacturing site of an industrial product, a robot that performs work such as welding and painting has been utilized. JP-A-2012-236247 (Patent Literature 1) discloses a multipurpose hand including a plurality of finger sections and a palm section.

However, the multipurpose hand disclosed in Patent Literature 1 needs to use not only the finger sections but also the palm section when stably gripping a jig for causing an object to perform predetermined action.

SUMMARY

A robot hand jig according to an aspect of the invention is gripped by a robot hand including a first finger section including a first fingertip section and a first side surface, a second finger section including a second fingertip section and a second side surface, a third finger section including a third fingertip section and a third side surface, and a moving palm section and causes an object to perform predetermined action. The robot hand jig includes a gripping section (a grip) including a first concave section configured to engage with the first finger section and a second concave section configured to engage with the second finger section. The first concave section includes a first surface, a second surface perpendicular to the first surface, a third surface perpendicular to the second surface, and a fourth surface perpendicular to the first surface and the second surface. The second concave section includes a fifth surface, a sixth surface perpendicular to the fifth surface, a seventh surface perpendicular to the sixth surface, and an eighth surface perpendicular to the fifth surface and the sixth surface. In a plan view from a perpendicular direction of the second surface, the third surface has a portion where a distance between a point where a first imaginary surface parallel to the fourth surface and the first surface cross and a point where the first imaginary surface and the third surface cross is smaller as the first imaginary surface is closer to the fourth surface and has a portion where the distance is larger as the first imaginary surface is farther from the fourth surface. In a plan view from a perpendicular direction of the sixth surface, the seventh surface has a portion where a distance between a point where a second imaginary surface parallel to the eighth surface and the fifth surface cross and a point where the second imaginary surface and the seventh surface cross is smaller as the second imaginary surface is closer to the eighth surface and has a portion where the distance is larger as the second imaginary surface is farther from the eighth surface. When the gripping section is gripped by the robot hand, the first fingertip section comes into contact with the first surface, the second fingertip section comes into contact with the fifth surface, the first side surface comes into contact with the third surface, and the second side surface comes into contact with the seventh surface.

In the robot hand jig, it is preferable that, when the gripping section is gripped by the robot hand, the first fingertip section comes into contact with the fourth surface, and the second fingertip section comes into contact with the eighth surface.

In the robot hand jig, it is preferable that the gripping section includes a third concave section configured to engage with the third finger section, the third concave section includes a ninth surface and a tenth surface perpendicular to the ninth surface, and, when the gripping section is gripped by the robot hand, the first side surface comes into contact with the second surface, the second side surface comes into contact with the sixth surface, and the third side surface comes into contact with the tenth surface.

In the robot hand jig, it is preferable that, when the gripping section is gripped by the robot hand, the third fingertip section comes into contact with the ninth surface.

In the robot hand jig, it is preferable that the gripping section includes a tool section configured to cause the object to perform the predetermined action.

In the robot hand jig, it is preferable that the gripping section includes a switch for operating the tool section and, when the gripping section is gripped by the robot hand, the switch is located between the palm section and the gripping section, and the switch is pressed by the palm section.

A robot according to another aspect of the invention grips the robot hand jig.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
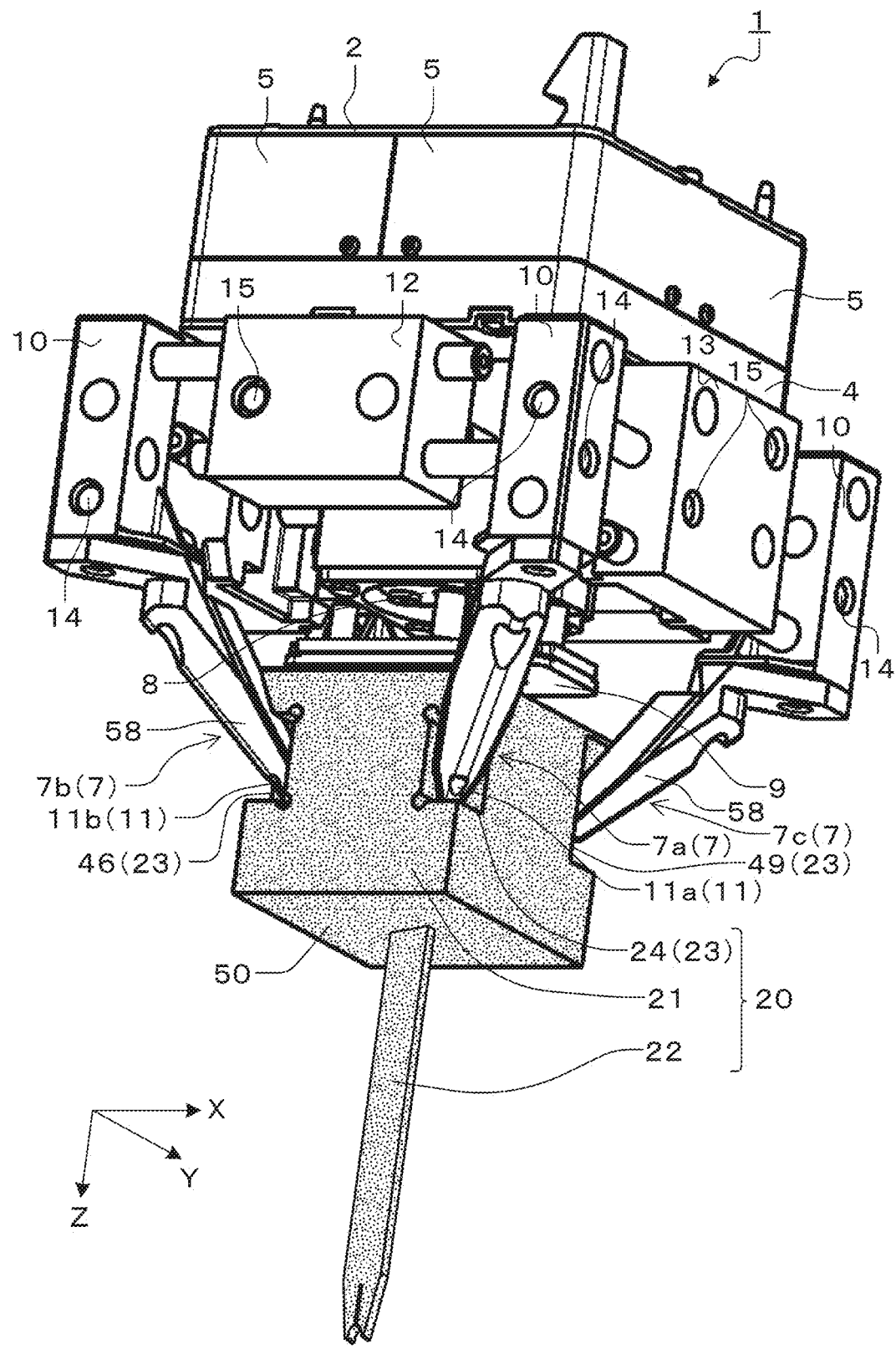
FIG. 1 is a schematic perspective view showing an E-ring assembly jig and a robot hand according to a first embodiment.

In embodiments, characteristic examples of a robot hand jig and a robot that grips the robot hand jig and performs machining or assembly are explained with reference to FIGS. 1 to 16. The embodiments are explained below with reference to the drawings. Note that members are shown in the drawings indifferent scales for each of the members to show the members in recognizable sizes on the drawings.

First Embodiment

An E-ring assembly jig functioning as a robot hand jig according to a first embodiment is explained with reference to FIGS. 1 to 5. The E-ring assembly jig is only an example. The robot hand jig may be jigs used for other uses.

FIG. 1 is a schematic perspective view showing an E-ring assembly jig 20 and a robot hand 1 according to this embodiment.

As shown in FIG. 1, the robot hand 1 includes a square substrate 2. The substrate 2 is a place where the robot hand 1 is attached to a not-shown robot. A direction in which one side among four sides of the substrate 2 extends is represented as an X direction. A direction orthogonal to the X direction is represented as a Y direction. A direction orthogonal to the X direction and the Y direction is represented as a Z direction.

Support columns 3 (see FIG. 4) are erected in the outer periphery of the substrate 2. A transmitting section 4 is connected to the support columns 3. A gear train, on the inside of which a plurality of gears are disposed, is set in the transmitting section 4. Three motors 5 are set on the substrate 2 side of the transmitting section 4. Gears are set in rotating shafts of the motors 5. The gears mesh with the gears of the transmitting section 4. Consequently, torque generated from the rotating shafts of the motors 5 is transmitted to the transmitting section 4.

A circuit board 6 (see FIG. 4) is set on the substrate 2 side of the motors 5. A driving circuit configured to drive the motors 5 and a detection circuit configured to detect rotation angles of the motors 5 are set on the circuit board 6. Further, a control circuit configured to control the rotation angles of the motors 5 is set on the circuit board 6.

In a +Z direction in FIG. 1 of the transmitting section 4, a first finger section 7a, a second finger section 7b, a third finger section 7c, a fourth finger section 7d (see FIG. 4), a stage moving section 8, and a stage 9 functioning as a palm section are set. The stage moving section 8 is set in the center of the transmitting section 4. The stage 9 is set in the +Z direction in FIG. 1 of the stage moving section 8. The stage moving section 8 reciprocatingly moves the stage 9 in the Z-direction in FIG. 1. Note that, in the following explanation, in explanation common to the first finger section 7a, the second finger section 7b, a third finger section 7c, and the fourth finger section 7d, these finger sections are simply referred to as "finger sections 7".

The finger sections 7 are disposed in a square tube shape at four corners around the stage moving section 8. The finger sections 7 include fingertip supporting sections 10 formed in a rectangular parallelepiped shape. Finger base sections 58 formed in a square pillar shape are set in a −Z direction in FIG. 1 of the fingertip supporting sections 10. The finger base sections 58 respectively include a first side surface 561, a second side surface 562 (see FIG. 2), a third side surface 563, and a fourth side surface 564 (see FIG. 4) toward the centers of the finger sections 7. In the −Z direction in FIG. 1 of the finger base sections 58, a first fingertip section 11a, a second fingertip section 11b, a third fingertip section 11c, and a fourth fingertip section 11d (see FIG. 4) are respectively set. The finger base sections 58 obliquely extend from the fingertip supporting sections 10 toward the centers of the finger sections 7. The four fingertip sections 11 are disposed to come into contact in the center of the stage moving section 8. Note that, in the following explanation, in explanation common to the first side surface 561, the second side surface 562, the third side surface 563, and the fourth side surface 564, these side surfaces are simply referred to as "side surfaces 56". In explanation common to the first fingertip section 11a, the second fingertip section 11b, the third fingertip section 11c, and the fourth fingertip section 11d, these fingertip sections are simply referred to as "fingertip sections 11".

A plurality of fingertip sections 11 form a four-finger hand including four fingers. The stage 9 is present among the four fingers. Accordingly, the four-finger hand formed by the plurality of fingertip sections 11 can be used.

When places where the four fingertip supporting sections 10 are disposed are assumed to be the positions of the corners of a square, first finger-movement guiding sections 12 and second finger-movement guiding sections 13 are disposed in places equivalent to the sides of the square. The first finger-movement guiding sections 12 are located in a +Y direction and a −Y direction of the stage moving section 8. The second finger-movement guiding sections 13 are located in a +X direction and a −X direction of the stage moving section 8. The first finger-movement guiding sections 12 and the second finger-movement guiding sections 13 are respectively located among the finger-tip supporting sections 10.

Pluralities of through-holes are set in the first finger-movement guiding sections 12 and the second finger-movement guiding sections 13. First finger guide bars and second finger guide bars 15 are inserted in the through-holes. The first finger guide bars 14 extend along imaginary lines passing through pairs of fingertip supporting sections 10 that sandwich the first finger-movement guiding sections 12 and the second finger-movement guiding sections 13. In the each of fingertip supporting section 10, two through-holes extending in the X direction and two through-holes extending in the Y direction are set. The first finger guide bars 14 are inserted in the holes. One of the first finger guide bars 14 inserted in the finger-tip supporting sections 10 and extending in the X direction is fixed to the finger-tip supporting section 10. One of the first finger guide bars 14 slides in the through-hole. Similarly, one of the first finger guide bars 14 inserted in the finger-tip supporting section 10 and extending in the Y direction is fixed to the finger-tip supporting section 10. One of the first finger guide bars 14 slides in the through-hole.

The first finger-movement guiding sections 12 and the second finger-movement guiding sections 13 are respectively disposed in positions sandwiching the stage moving section 8. In each of the first finger-movement guiding sections 12, two through-holes extending in the Y direction are set. The second finger guide bars 15 are inserted in the through-holes. One of the two second finger guide bars 15 is fixed to the first finger-movement guiding section 12. One of the two second finger guide bars 15 slides in the through-hole. In each of the second finger-movement guiding sections 13, four through-holes extending in the X direction are set. The second finger guide bars 15 are inserted in the through-holes. Two of the four second finger guide bars 15 are fixed to the second finger-movement guiding sections 13. Two of the four second finger guide bars 15 slide in the through-holes. The two second finger guide bars 15 extend along an imaginary line in the Y direction passing the first finger-movement guiding sections 12 that sandwich the stage moving section 8. The four second finger guide bars 15 extend along an imaginary line in the X direction passing the second finger-movement guiding sections 13 that sandwich the stage moving section 8. The first finger guide bars 14 and the second finger guide bars 15 restrict moving directions in which the finger-tip supporting sections 10, the first finger-movement guiding sections 12, and the second finger-movement guiding sections 13 move.

As shown in FIG. 1, the robot according to this embodiment grips the E-ring assembly jig 20 with the four finger sections 7 and performs machining or assembly.

The E-ring assembly jig 20 is a robot hand jig gripped by the robot hand 1 and configured to cause an object to perform predetermined action (E-ring assembly). The E-ring assembly jig 20 includes a grip section 21 functioning as a gripping section including, in positions corresponding to the finger sections 7 of the robot hand 1, a first concave shape 24 (first depression) functioning as a first concave section, a second concave shape 46 functioning as a second concave section, a third concave shape 49 functioning as a third concave section, and a fourth concave shape (not shown in FIG. 1). The first concave shape 24 engages with the first finger section 7a. The second concave shape 46 engages with the second finger section 7b. The third concave shape 49 engages with the third finger section 7c. The fourth concave shape engages with the fourth finger section 7d. Note that, in the following explanation, in explanation common to the first concave shape 24, the second concave shape 46, the third concave shape 49, and the fourth concave shape, these concave shapes are simply referred to as "concave shapes 23".

The E-ring assembly jig 20 includes an E-ring assembly tool 22 functioning as a tool section provided at a first end portion 50 of the grip section 21. When the grip section 21 is gripped by the robot hand 1, the grip section 21 is located between the finger base sections 58 and the E-ring assembly tool 22. The grip section 21 includes the E-ring assembly tool 22 configured to cause an object to perform predetermined action. Accordingly, when the grip section 21 is gripped by the robot hand 1, the E-ring assembly tool 22 provided in the E-ring assembly jig 20 can be used.

Figure 2:
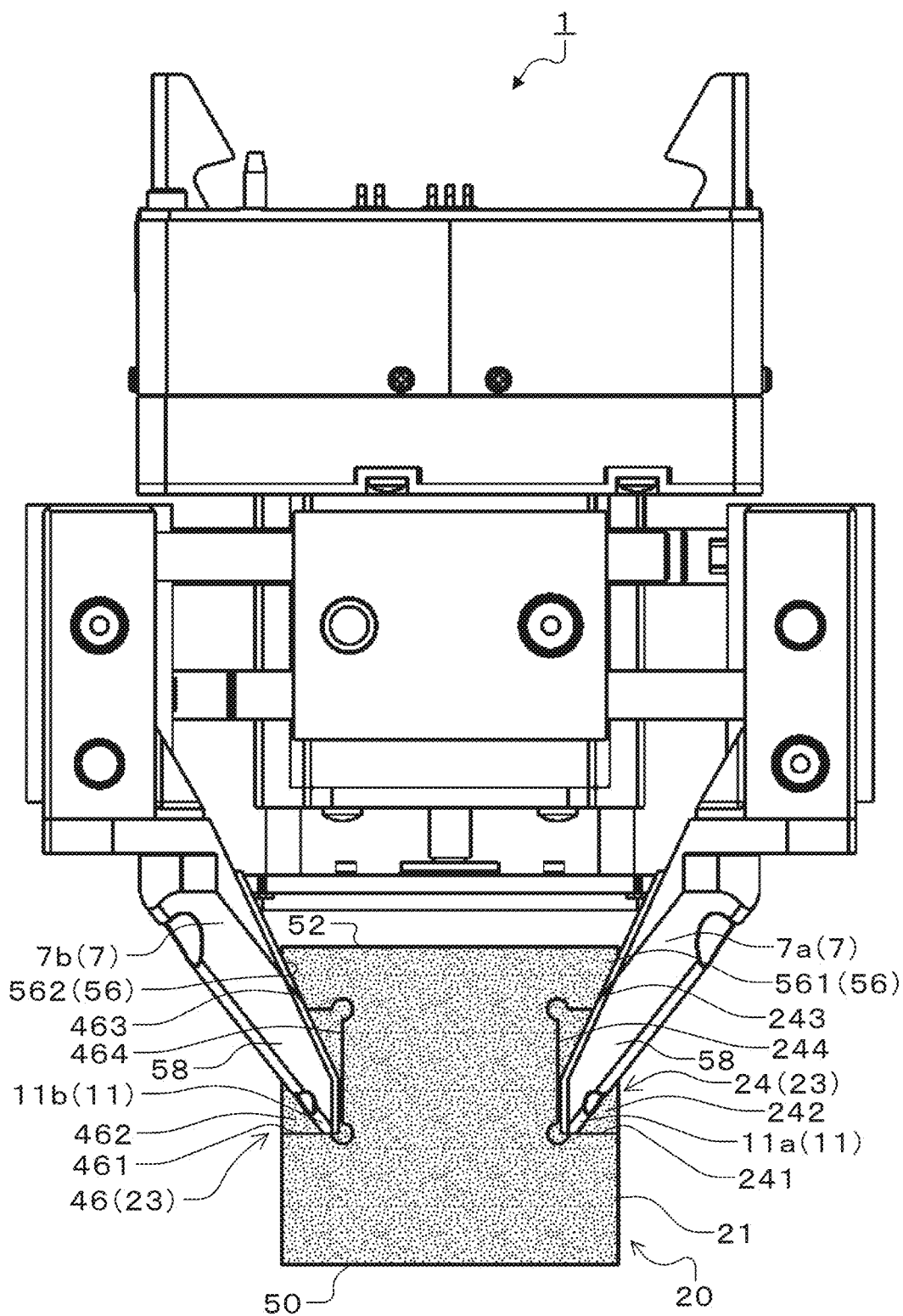
FIG. 2 is a schematic elevation showing the E-ring assembly jig and the robot hand according to the first embodiment.
Figure 3:
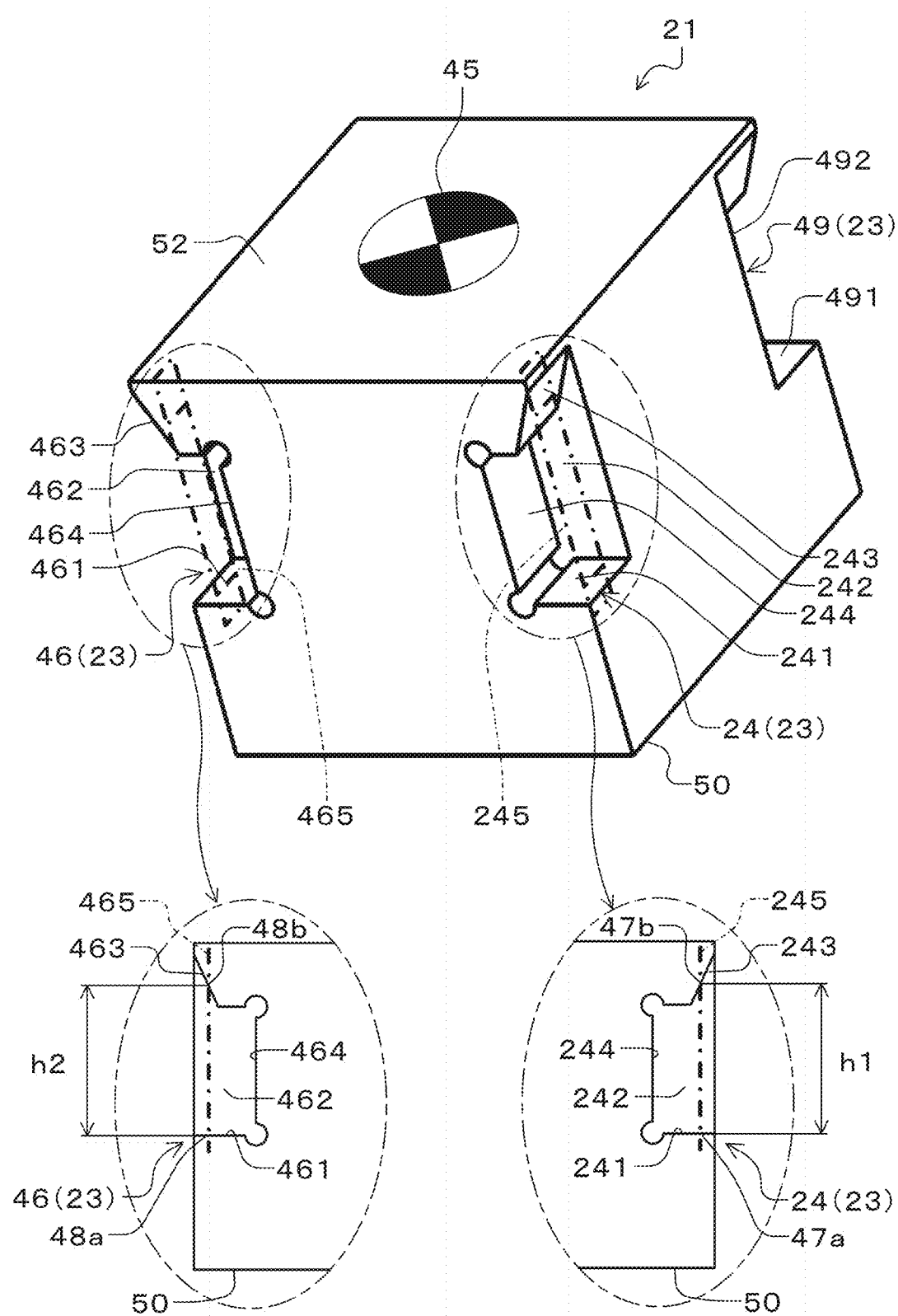
FIG. 3 is a schematic perspective view showing a grip section according to the first embodiment.

FIG. 2 is a schematic elevation showing the E-ring assembly jig 20 and the robot hand 1 according to this embodiment. Note that the E-ring assembly tool 22 is not shown in FIG. 2. FIG. 3 is a schematic perspective view showing the grip section 21 according to this embodiment.

The first finger section 7a includes the first fingertip section 11a and the first side surface 561 different from the first fingertip section 11a. The second finger section 7b including the second fingertip section 11b and the second side surface 562 different from the second fingertip section 11b. The third finger section 7c includes the third fingertip section 11c and the third side surface 563 different from the third fingertip section 11c (see FIG. 4). The fourth finger section 7d includes the fourth fingertip section 11d and the fourth side surface 564 different from the fourth fingertip section 11d (see FIG. 4). The E-ring assembly jig 20 includes the grip section 21 including the first concave shape 24 that engages with the first finger section 7a, the second concave shape 46 that engages with the second finger section 7b, the third concave shape 49 that engages with the third finger section 7c, and the fourth concave shape that engages with the fourth finger section 7d. Note that the first concave shape 24, the second concave shape 46, the third concave shape 49, and the fourth concave shape have the same configuration. Therefore, in the following explanation, the first concave shape 24 and the second concave shape 46 are used.

The first concave shape 24 includes a first surface 241, a second surface 242 perpendicular to the first surface 241, a third surface 243 perpendicular to the second surface 242, and a fourth surface 244 perpendicular to the first surface 241 and the second surface 242.

In the grip section 21 according to this embodiment, as shown in FIG. 3, a first imaginary surface 245 parallel to the fourth surface 244 is caused to cross the first surface 241 and the third surface 243.

In a plan view from the perpendicular direction of the second surface 242, the third surface 243 has a portion where a distance h1 between a first point 47a where the first imaginary surface 245 parallel to the fourth surface 244 and the first surface 241 cross and a second point 47b where the first imaginary surface 245 and the third surface 243 cross is smaller as the first imaginary surface 245 is closer to the fourth surface 244 and has a portion where the distance h1 is larger as the first imaginary surface 245 is farther from the fourth surface 244. In other words, the third surface 243 is a surface that perpendicularly crosses the second surface 242 and the distance of which from the first surface 241 is longer as the third surface 243 is farther away from the fourth surface 244.

The second concave shape 46 includes a fifth surface 461 located on the same plane as the first surface 241, a sixth surface 462 perpendicular to the fifth surface 461, a seventh surface 463 perpendicular to the sixth surface 462, and an eighth surface 464 perpendicular to the fifth surface 461 and the sixth surface 462.

In the grip section 21 according to this embodiment, as shown in FIG. 3, a second imaginary surface 465 parallel to the eighth surface 464 is caused to cross the fifth surface 461 and the seventh surface 463.

In a plan view from the perpendicular direction of the sixth surface 462, the seventh surface 463 has a portion where a distance h2 between a third point 48a where the second imaginary surface 465 parallel to the eighth surface 464 and the fifth surface 461 cross and a fourth point 48b where the second imaginary surface 465 and the seventh surface 463 cross is smaller as the second imaginary surface 465 is closer to the eighth surface 464 and has a portion where the distance h2 is larger as the second imaginary surface 465 is farther from the eighth surface 464. In other words, the seventh surface 463 is a surface that perpendicularly crosses the sixth surface 462 and the distance of which from the fifth surface 461 is longer as the seventh surface 463 is farther away from the eighth surface 464.

In the E-ring assembly jig 20 in this embodiment, when the grip section 21 is gripped by the robot hand 1, the first fingertip section 11a comes into contact with the first surface 241, the second fingertip section 11b comes into contact with the fifth surface 461, the first side surface 561 comes into contact with the third surface 243, and the second side surface 562 comes into contact with the seventh surface 463.

When the grip section 21 is gripped by the robot hand 1, the first fingertip section 11a comes into contact with the fourth surface 244 and the second fingertip section 11b comes into contact with the eighth surface 464. Accordingly, when the grip section 21 is gripped by the robot hand 1, engaging loads between the first finger section 7a and the fourth surface 244 and between the second finger section 7b and the eighth surface 464 increase.

The third concave shape 49 includes a ninth surface 491 located on the same plane as the first surface 241 and the fifth surface 461 and a tenth surface 492 perpendicular to the ninth surface 491. When the grip section 21 is gripped by the robot hand 1, the first side surface 561 comes into contact with the second surface 242, the second side surface 562 comes into contact with the sixth surface 462, and the third side surface 563 comes into contact with the tenth surface 492. Accordingly, the third finger section 7c of the robot hand 1 can come into contact with the third concave shape 49 of the grip section 21. Consequently, the robot hand 1 can stably grip the E-ring assembly jig 20.

The grip section 21 is a rectangular parallelepiped. In the grip section 21, concave shapes 23 are present at end portions of opposed surfaces of the grip section 21. The concave shapes 23 come into contact with the finger sections 7. Accordingly, the finger sections 7 of the robot hand 1 can come into contact with the concave shapes 23 of the grip section 21. Consequently, the robot hand 1 can stably grip the E-ring assembly jig 20.

The first surface 241 and the fourth surface 244 come into contact with the first fingertip section 11a of the first finger section 7a. The third surface 243 comes into contact with the first side surface 561 of the first finger section 7a. Consequently, the robot hand 1 can perform gripping using three or more surfaces of the first concave shape 24. The robot hand 1 can stably grip the E-ring assembly jig 20.

The fifth surface 461 and the eighth surface 464 come into contact with the second fingertip section 11b of the second finger section 7b. The seventh surface 463 comes into contact with the second side surface 562 of the second finger section 7b. Consequently, the robot hand 1 can perform gripping using three or more surfaces of the second concave shape 46. The robot hand 1 can stably grip the E-ring assembly jig 20.

The ninth surface 491 comes into contact with the third fingertip section 11c of the third finger section 7c. The tenth surface 492 comes into contact with the third side surface 563 of the third finger section 7c. Consequently, the robot hand 1 can perform gripping using two or more surfaces of the third concave shape 49. The robot hand 1 can stably grip the E-ring assembly jig 20.

The first concave shape 24 includes the second surface 242. Accordingly, when gripping the E-ring assembly jig 20, the first finger section 7a of the robot hand 1 can increase surfaces that come into contact with the E-ring assembly jig 20. Consequently, the robot hand 1 can stably grip the E-ring assembly jig 20.

The second concave shape 46 includes the sixth surface 462. Accordingly, when gripping the E-ring assembly jig 20, the second finger section 7b of the robot hand 1 can increase surfaces that come into contact with the E-ring assembly jig 20. Consequently, the robot hand 1 can stably grip the E-ring assembly jig 20.

The third concave shape 49 includes the tenth surface 492. Accordingly, when gripping the E-ring assembly jig 20, the third finger section 7c of the robot hand 1 can increase surfaces that come into contact with the E-ring assembly jig 20. Consequently, the robot hand 1 can stably grip the E-ring assembly jig 20.

The second surface 242 comes into contact with the first fingertip section 11a of the first finger section 7a. Accordingly, the first fingertip section 11a of the first finger section 7a of the robot hand 1 can come into contact with the fourth surface 244. Consequently, the robot hand 1 can stably grip the E-ring assembly jig 20.

The sixth surface 462 comes into contact with the second fingertip section 11b of the second finger section 7b. Accordingly, the second fingertip section 11b of the second finger section 7b of the robot hand 1 can come into contact with the eighth surface 464. Consequently, the robot hand 1 can stably grip the E-ring assembly jig 20.

The plurality of concave shapes 23 are present on each of the opposed surfaces of the grip section 21. The two concave shapes 23 are present on each of the opposed surfaces of the grip section 21. The concave shapes 23 come into contact with the fingertip sections 11. The concave shapes 23 come into contact with the side surfaces 56 of the finger base sections 58. The fingertip sections 11 grip the concave shapes 23. The side surfaces 56 grip the concave shapes 23. The concave shapes 23 are provided in positions where the fingertip sections 11 and the side surfaces 56 grip the grip section 21. The disposed positions of the concave shapes 23 correspond to the gripped positions of the fingertip sections 11. The grip section 21 includes the concave shapes 23 in portions corresponding to the fingertip sections 11 and the side surfaces 56. Accordingly, because the concave shapes 23 are present in the grip section 21, the E-ring assembly jig 20 can be surely gripped. The fingertip sections 11 and the side surfaces 56 come into contact with the concave shapes 23 and grip the grip section 21. Therefore, even in work with a large load, the E-ring assembly jig 20 less easily positionally deviates from the plurality of fingertip sections 11 and the plurality of side surfaces 56.

A second end portion 52 of the grip section 21 is a plane. A marker 45 for identifying the E-ring assembly jig 20 is provided on the second end portion 52. The distance from the robot to the marker 45 and the position and the posture of the robot can be measured using the marker 45.

The marker 45 is stuck to the second end portion 52 of the grip section 21. A sufficient space for sticking the marker 45 detectable by a robot vision is present at the second end portion 52. Accordingly, because the grip section 21 is gripped by the plurality of fingertip sections 11 and the plurality of side surfaces 56, even in work with a large load, the E-ring assembly jig 20 less easily positionally deviates from the plurality of fingertip sections 11 and the plurality of side surfaces 56. Because the marker 45 can be stuck on the second end portion 52, for example, it is possible to acquire identification information of the E-ring assembly jig 20 embedded in the marker 45. The robot itself can perform, on the basis of the identification information, control for changing a way of holding the E-ring assembly jig 20. Note that a color of the second end portion 52 is desirably white or black without luster to make it easy to detect the marker 45 with the robot vision. Direct light reflected on the surface of the second end portion 52 changes to noise. Therefore, the second end portion 52 is desirably a state without gloss and luster.

The marker 45 is a tangible object forming a character, a figure, a sign, or a pattern, a three-dimensional shape, a combination of the character, the figure, the sign, or the pattern and the three-dimensional shape, or a combination of the character, the figure, the sign, or the pattern, the three-dimensional shape, and a color that can be used as a mark. The marker 45 can be fixed to an object. The marker 45 is, for example, a seal, a sticker, or a label. Note that the shape, the color, the pattern, and the like of the marker 45 may be any shape, any color, any pattern, and the like. However, the shape, the color, the pattern, and the like of the marker 45 are desirably an object easily distinguishable from other regions in stably detecting the marker 45. For example, the marker 45 is desirably an image, a seal, or the like colored in black in a white region. As a specific example, the marker 45 may be a QR (Quick Response) code, an AR (Augmented Reality) marker, or the like. As an exception, the marker 45 may be an image displayable on a display section.

The grip section 21 is made of a resin material or a metal material. The material of the grip section 21 may be either resin or metal (aluminum, iron, stainless steel, etc.). The grip section 21 may be made of a resin material (e.g., POM (polyoxymethylene)) or the like. Accordingly, the rigidity of the grip section 21 is increased by forming the grip section 21 from the resin material or the metal material. The grip section 21 is less easily deformed when the grip section 21 is pressed by the plurality of finger sections 11 and the plurality of side surfaces 56.

Figure 4:
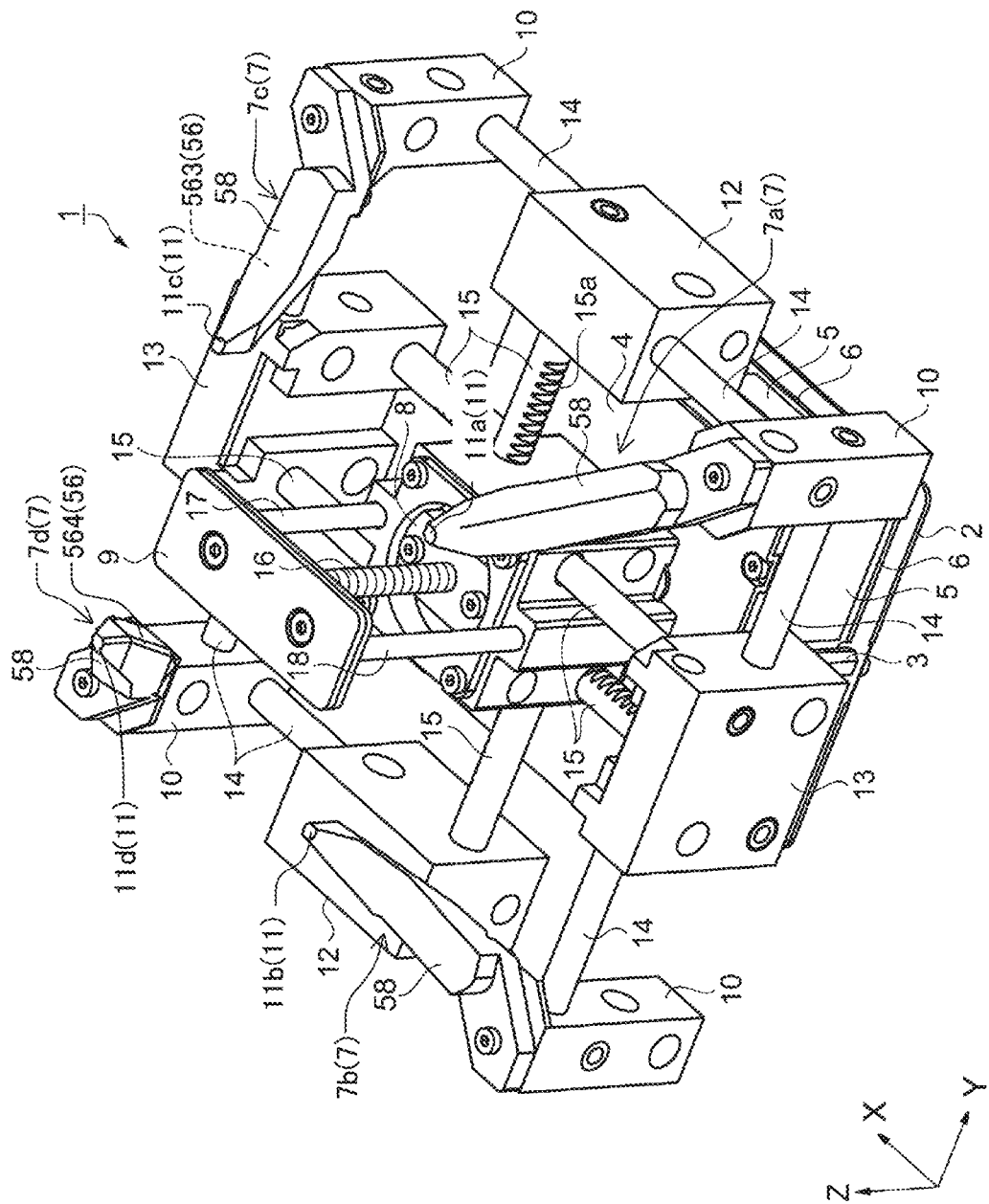
FIG. 4 is a schematic perspective view showing the structure of the robot hand according to the first embodiment.

FIG. 4 is a schematic perspective view showing the structure of the robot hand 1 according to this embodiment and is a diagram showing a state in which the fingertip sections 11 are separated.

As shown in FIG. 4, rack gears 15a on which grooves are formed at equal intervals are set on the side surfaces of the second finger guide bars 15. Pinions that mesh with the rack gears 15a of the second finger guide bars 15 are set near the stage moving section 8.

Torque of the rotating shaft of one motor 5 is transmitted to the pinions via the transmitting section 4. The pinions rotate, whereby the second finger guide bars 15 move. The robot hand 1 can change an interval between the first finger-movement guiding sections 12 and the stage moving section 8 according to the movement of the second finger guide bars 15. The two first finger-movement guiding sections 12 simultaneously approach the stage moving section 8 and simultaneously separate from the stage moving section 8. At this time, the four fingertip sections 11 simultaneously approach in the Y direction and simultaneously separate.

Similarly, torque of the rotating shaft of one motor 5 is transmitted to the pinions via the transmitting section 4. The pinions rotate, whereby the second finger guide bars 15 move. The robot hand 1 can change the interval between the second finger-movement guiding sections 13 and the stage moving section 8 according to the movement of the second finger guide bars 15. The two second finger-movement guiding sections 13 simultaneously approach the stage moving section 8 and simultaneously separate from the stage moving section 8. At this time, the four fingertip sections 11 simultaneously approach in the X direction and simultaneously separate. Therefore, the torque of the motor 5 is transmitted to the transmitting section 4. The fingertip sections 11 are opened and closed by the torque transmitted by the transmitting section 4.

From the stage 9, a driving shaft 16, a first guide bar 17, and a second guide bar 18 extending in the −Z direction are set. The driving shaft 16, the first guide bar 17, and the second guide bar 18 are inserted into the stage moving section 8. The stage moving section 8 moves the driving shaft 16 in the Z direction. The driving shaft 16 is disposed between the first guide bar 17 and the second guide bar 18.

Therefore, because a moment of force less easily acts on the first guide bar 17 and the second guide bar 18, the stage 9 can stably move.

Accordingly, the robot can perform stable gripping only with the finger sections 7 of the robot hand 1 and can perform additional operation (on the E-ring assembly jig 20) with the stage 9 while gripping the E-ring assembly jig 20. As a result, the robot can contribute to diversification of work that can be performed by the robot.

Example 1

Figure 5:
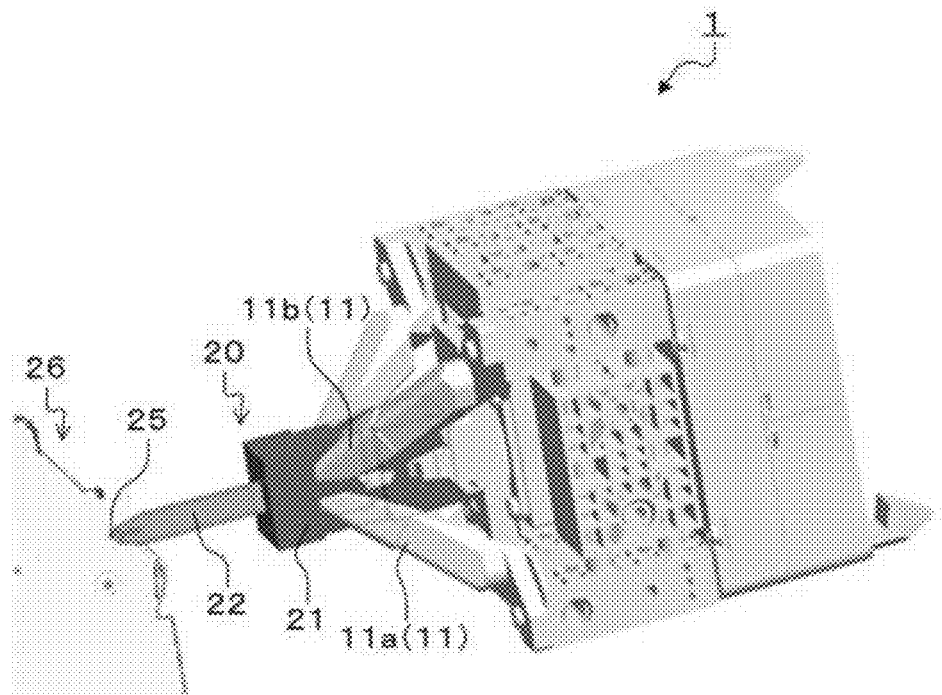
FIG. 5 is a schematic perspective view showing work performed using the E-ring assembly jig according to the first embodiment.

FIG. 5 is a schematic perspective view showing work performed using the E-ring assembly jig 20 according to this embodiment.

In the example shown in FIG. 5, machining for attaching an E ring 25 to work 26 using the robot hand 1 that grips the E-ring assembly jig 20 is shown. According to the machining, forces acting on the fingertip sections 11 and the side surfaces 56 of the robot hand 1 can be sufficiently transmitted to the E ring 25 via the grip section 21 and the E-ring assembly tool 22 of the E-ring assembly jig 20. The robot hand 1 can perform additional operation (on the E-ring assembly jig 20) with the stage 9 while gripping the E-ring assembly jig 20.

Example 2

A robot hand 43 gripping a work insertion jig 27 functioning as the robot hand jig according to this embodiment and a robot hand 44 gripping a work extrusion jig 29 functioning as the robot hand jig are explained with reference to FIGS. 6 to 8.

Figure 6:
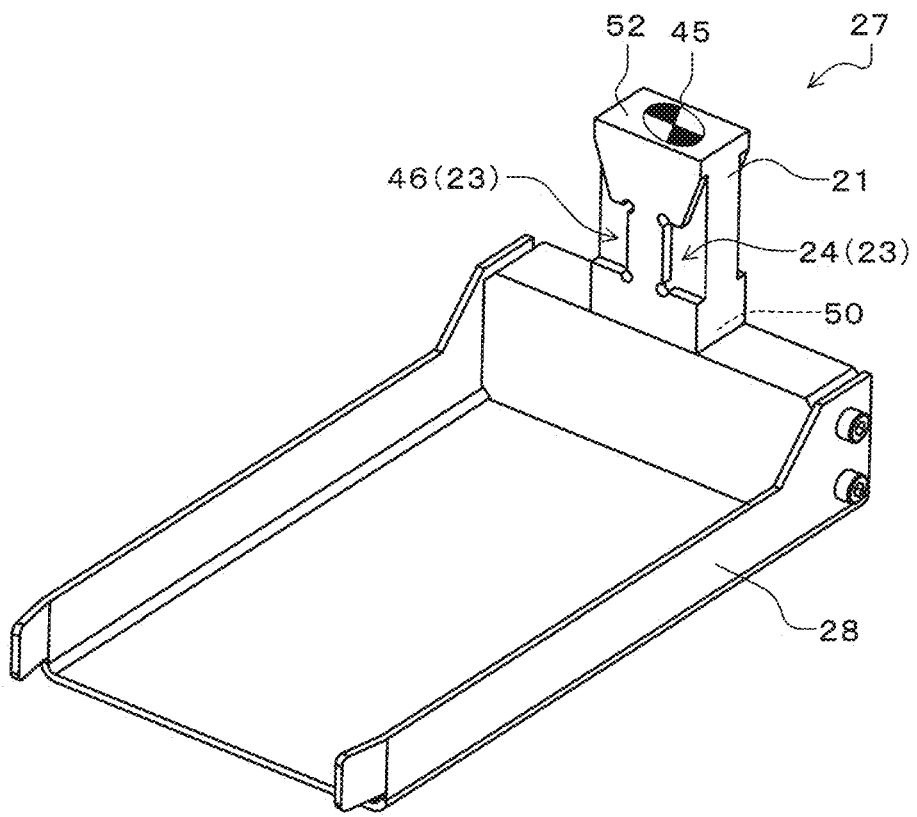
FIG. 6 is a schematic perspective view showing a work insertion jig according to the first embodiment.

FIG. 6 is a schematic perspective view showing the work insertion jig 27 according to this embodiment. FIG. 7 is a schematic perspective view showing the work extrusion jig according to this embodiment. FIG. 8 is a schematic perspective view showing work performed using the work insertion jig 27 and the work extrusion jig 29 according to this embodiment.

The work insertion jig 27 according to this embodiment includes, as shown in FIG. 6, the grip section 21 having the concave shapes 23 in portions corresponding to the positions of the plurality of fingertip sections 11 and the plurality of side surfaces 56 and a work insertion tool 28 functioning as a tool section provided at the first end portion 50 of the grip section 21. The marker 45 for identifying the work insertion jig 27 is provided on the second end portion 52.

Figure 7:
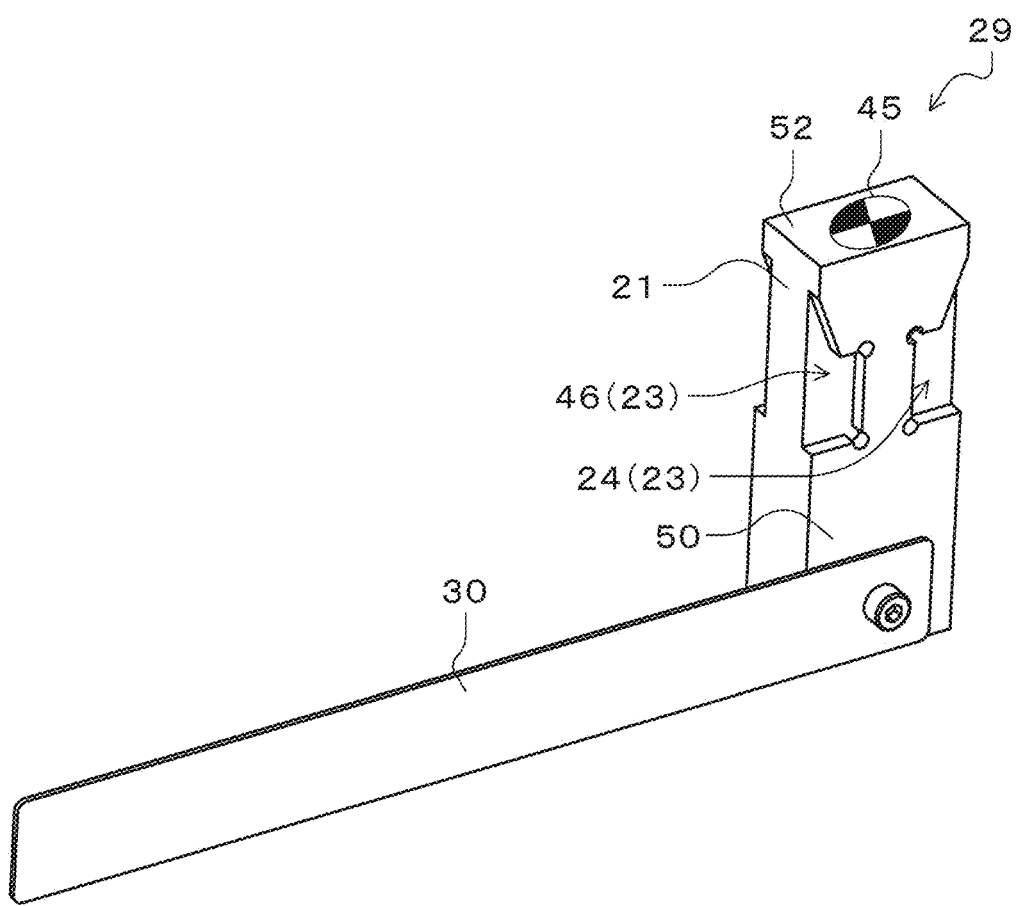
FIG. 7 is a schematic perspective view showing a work extrusion jig according to the first embodiment.

The work extrusion jig 29 includes, as shown in FIG. 7, the grip section 21 having the concave shapes 23 in portions corresponding to the positions of the plurality of fingertip sections 11 and the plurality of side surfaces 56 and a work extrusion tool 30 functioning as a tool section provided at the first end portion 50 of the grip section 21. The marker 45 for identifying the work extrusion jig 29 is provided on the second end portion 52.

Figure 8:
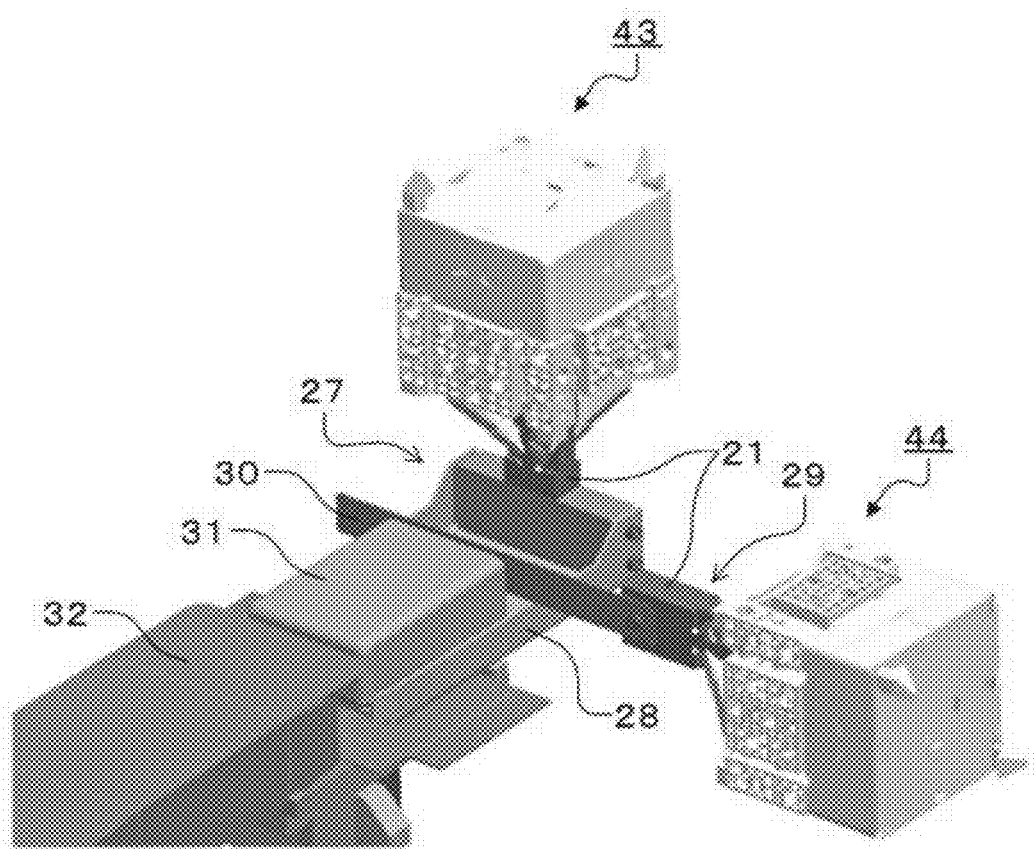
FIG. 8 is a schematic perspective view showing work performed using the work insertion jig and the work extrusion jig according to the first embodiment.

In an example shown in FIG. 8, assembly for inserting work 31 into a box 32 using the robot hand 43 gripping the work insertion jig 27 and the robot hand 44 gripping the work extrusion jig 29 is shown. The work insertion jig 27 is a jig that inserts the work 31 into the box 32. The work extrusion jig 29 is a jig that extrudes the work 31 into the box 32. The robot hand 1 in the first embodiment is used as the robot hands 43 and 44. Accordingly, forces acting on the fingertip sections 11 and the side surfaces 56 of the robot hand 43 can be sufficiently transmitted to the work 31 via the grip section 21 and the work insertion tool 28 of the work insertion jig 27. Forces acting on the fingertip sections 11 and the side surfaces 56 of the robot hand 44 can be sufficiently transmitted to the work 31 via the grip section 21 and the work extrusion tool 30 of the work extrusion jig 29.

According to this embodiment, the first finger section 7a can be engaged in the first concave shape 24 including the first surface 241, the third surface 243, and the fourth surface 244. When the robot hand 1 grips the E-ring assembly jig 20, the first finger section 7a engages in the first concave shape 24 on the first surface 241 on one hand and on the third surface 243 on the other. The first surface 241 and the third surface 243 are configured to be in a relation of a wedge each other. Therefore, engaging loads between the first finger section 7a and the first surface 241 and between the first finger section 7a and the third surface 243 increase.

The second finger section 7b can be engaged in the second concave shape 46 including the fifth surface 461, the seventh surface 463, and the eighth surface 464. When the robot hand 1 grips the E-ring assembly jig 20, the second finger section 7b engages in the second concave shape 46 on the fifth surface 461 on one hand and on the seventh surface 463 on the other. The fifth surface 461 and the seventh surface 463 are configured to be in a relation of a wedge each other. Therefore, engaging loads between the second finger section 7b and the fifth surface 461 and between the second finger section 7b and the seventh surface 463 increase.

Consequently, the robot hand 1 can perform stable gripping only with the first finger section 7a and the second finger section 7b and perform additional operation (on the E-ring assembly jig 20) with the stage 9 while gripping the E-ring assembly jig 20. As a result, the robot hand 1 can contribute to diversification of work that can be performed by the robot.

When the robot hand 1 grips the grip section 21, the first finger section 7a contacts with the first surface 241 and the third surface 243 to engages in the first concave shape 24. The first surface 241 and the third surface 243 are configured to be in a relation of a wedge each other. Therefore, engaging loads between the first finger section 7a and the first surface 241 and between the first finger section 7a and the third surface 243 increase. Consequently, the robot hand 1 can perform stable gripping only with the first finger section 7a. The second finger section 7b contacts with the fifth surface 461 and the seventh surface 463 to engages in the second concave shape 46. The fifth surface 461 and the seventh surface 463 are configured to be in a relation of a wedge each other. Therefore, engaging loads between the second finger section 7b and the fifth surface 461 and between the second finger section 7b and the seventh surface 463 increase. Consequently, the robot hand 1 can perform stable gripping with the second finger section 7a and the second finger section 7b.

Second Embodiment

A robot including the robot hand 1 in the first embodiment is explained with reference to FIGS. 9 to 11.

Figure 9:
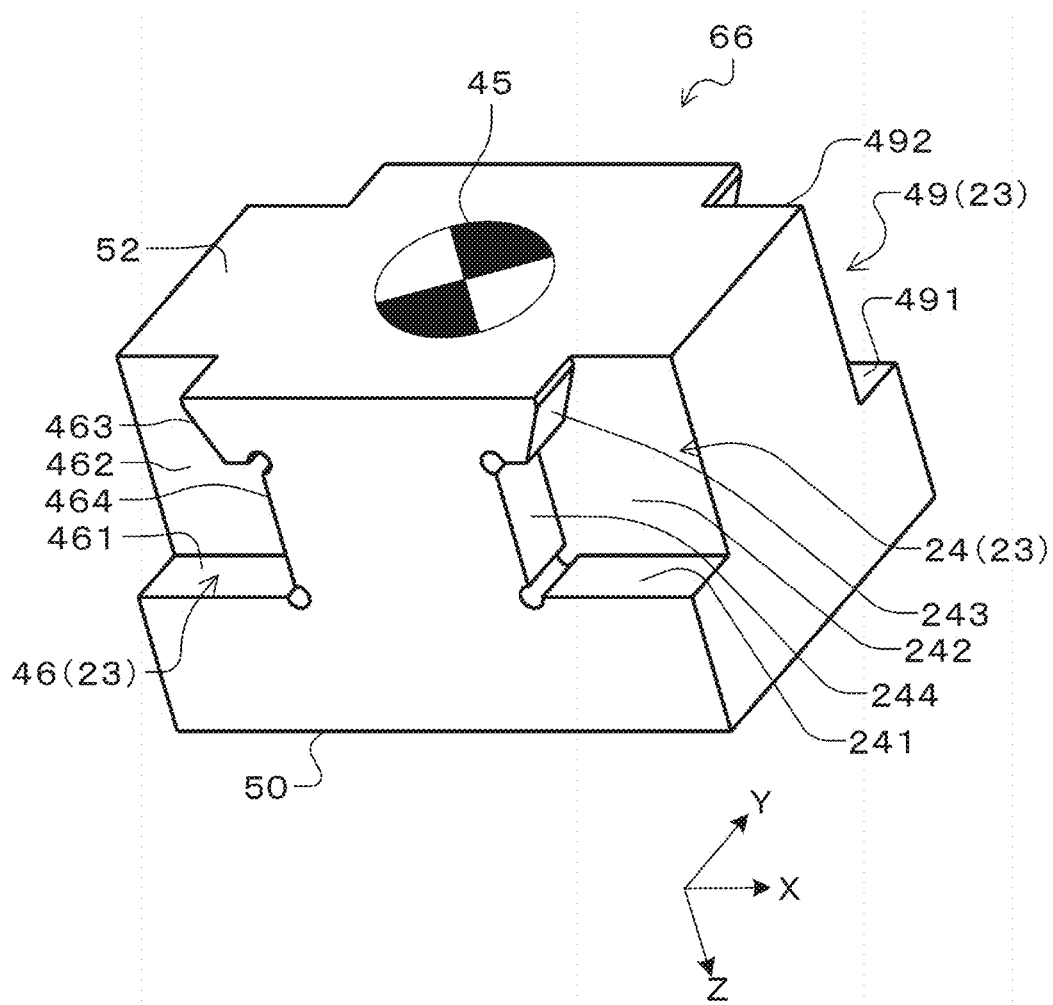
FIG. 9 is a schematic perspective view showing a grip section according to a second embodiment.

FIG. 9 is a schematic perspective view showing a grip section 66 according to a second embodiment. FIG. 10 is a schematic perspective view showing an E-ring assembly jig 60 and the robot hand 1 according to this embodiment. FIG. 11 is a schematic perspective view showing the E-ring assembly jig 60 and the robot hand 1 according to this embodiment. Note that the E-ring assembly tool 22 is not shown in FIGS. 9 to 11. The first concave shape 24, the second concave shape 46, the third concave shape 49, and the fourth concave shape have the same configuration. Therefore, in the following explanation, the first concave shape 24 is used.

In the first concave shape 24 of the grip section 66 functioning as a gripping section of the E-ring assembly jig 60 functioning as a robot hand jig in this embodiment, as shown in FIG. 9, a region of the first surface 241 expands further to the outer side (the +X direction or the −X direction) than the end portion of the third surface 243. The first fingertip section 11a lowered in the +Z direction comes into contact with the first surface 241.

Figure 10:
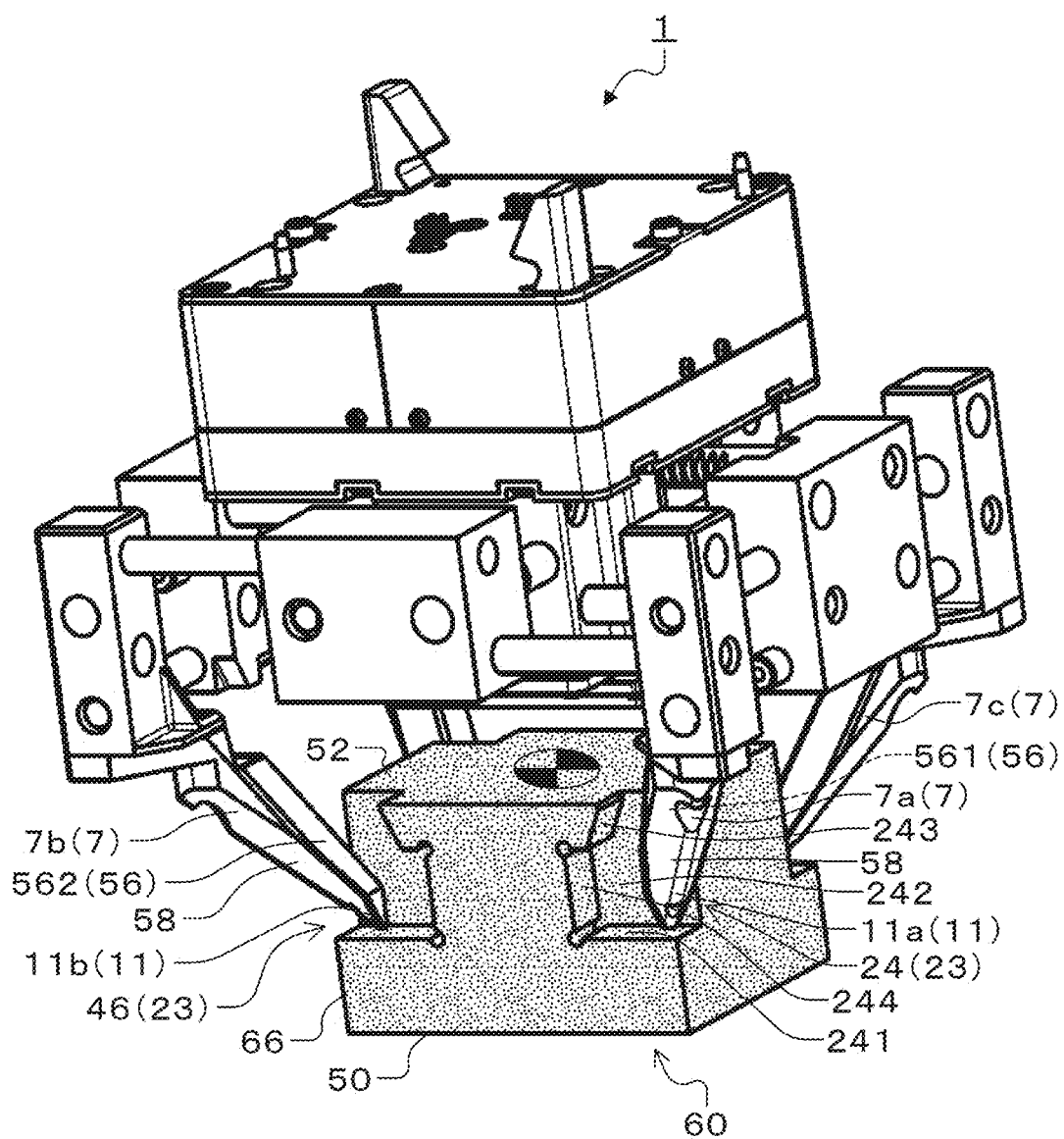
FIG. 10 is a schematic perspective view showing an E-ring assembly jig and a robot hand according to the second embodiment.
Figure 11:
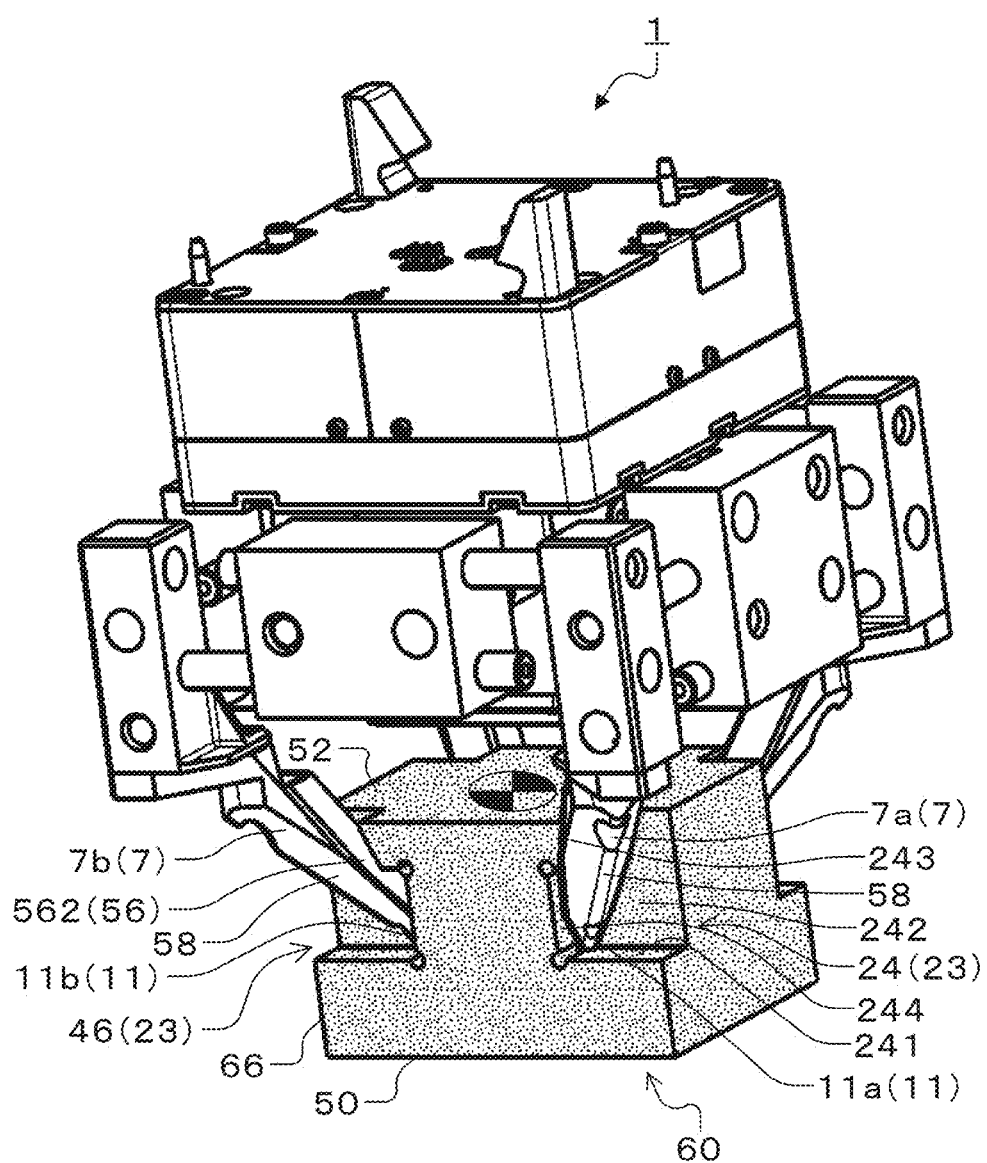
FIG. 11 is a schematic perspective view showing the E-ring assembly jig and the robot hand according to the second embodiment.

As shown in FIGS. 10 and 11, when the first finger section 7a is opened and closed, the first surface 241 comes into contact with the first fingertip section 11a of the first finger section 7a. Accordingly, the first fingertip section 11a of the first finger section 7a of the robot hand 1 can come into contact with the first surface 241 when the first finger section 7a is opened and closed. Consequently, the robot hand 1 can perform positioning of the first fingertip section 11a with respect to the first concave shape 24 when the first finger section 7a is opened and closed and can stabilize gripping.

The first surface 241 with which the opened first fingertip section 11a is brought into contact is set to a large area compared with the first surface 241 in the first embodiment. Consequently, the robot hand 1 can perform positioning of the first fingertip section 11a with respect to the first concave shape 24 and stabilize gripping. By closing the first finger section 7a after positioning the height of the first fingertip section 11a, the robot hand 1 can stabilize gripping.

Third Embodiment

A robot including the robot hand 1 in the first embodiment is explained with reference to FIGS. 12 and 13.

Figure 12:
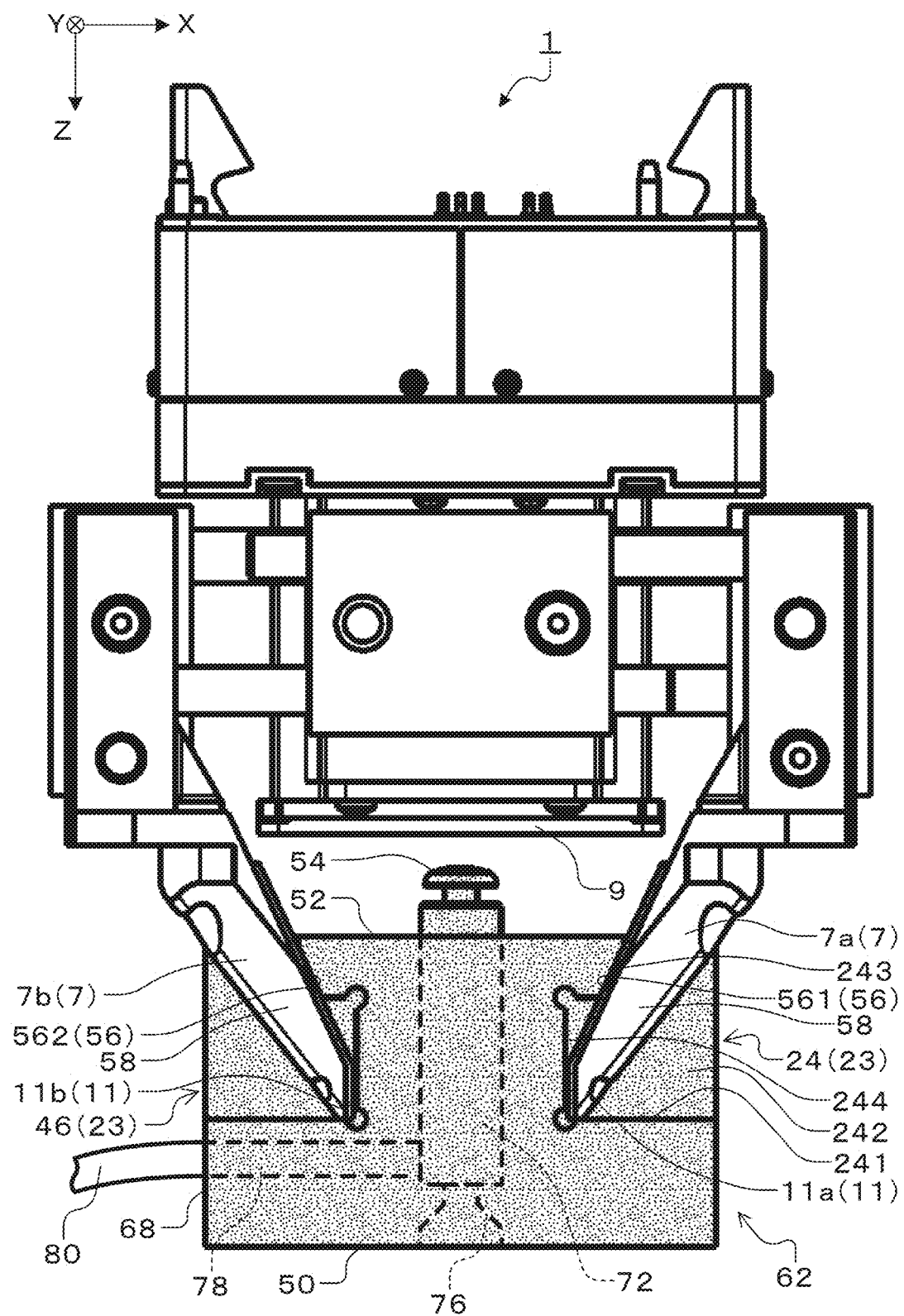
FIG. 12 is a schematic elevation showing an E-ring assembly jig and a robot hand according to a third embodiment.

FIG. 12 is a schematic elevation showing an E-ring assembly jig 62 and the robot hand 1 according to a third embodiment. FIG. 13 is a schematic elevation showing the E-ring assembly jig 62 and the robot hand 1 according to this embodiment.

In a grip section 68, a switch 54 is provided at the second end portion 52 different from the first end portion 50. When the grip section 68 is gripped by the robot hand 1, the switch 54 is located between the stage 9 and the grip section 68. Accordingly, the robot hand 1 can perform stable gripping only with the finger sections 7 and perform operation of the switch 54 with the stage 9 while gripping the E-ring assembly jig 62. As a result, the robot hand 1 can contribute to diversification of work that can be performed by the robot.

The switch 54 is a changeover switch of a valve 72. Accordingly, the robot hand 1 can perform stable gripping only with the finger sections 7 and perform operation of the switch 54 of the valve 72 with the stage 9 while gripping the E-ring assembly jig 62. As a result, the robot hand 1 can contribute to diversification of work that can be performed by the robot. Accordingly, the robot hand 1 can perform stable gripping only with the finger sections 7. The robot hand 1 can contribute to diversification of work that can be performed by the robot.

Figure 13:
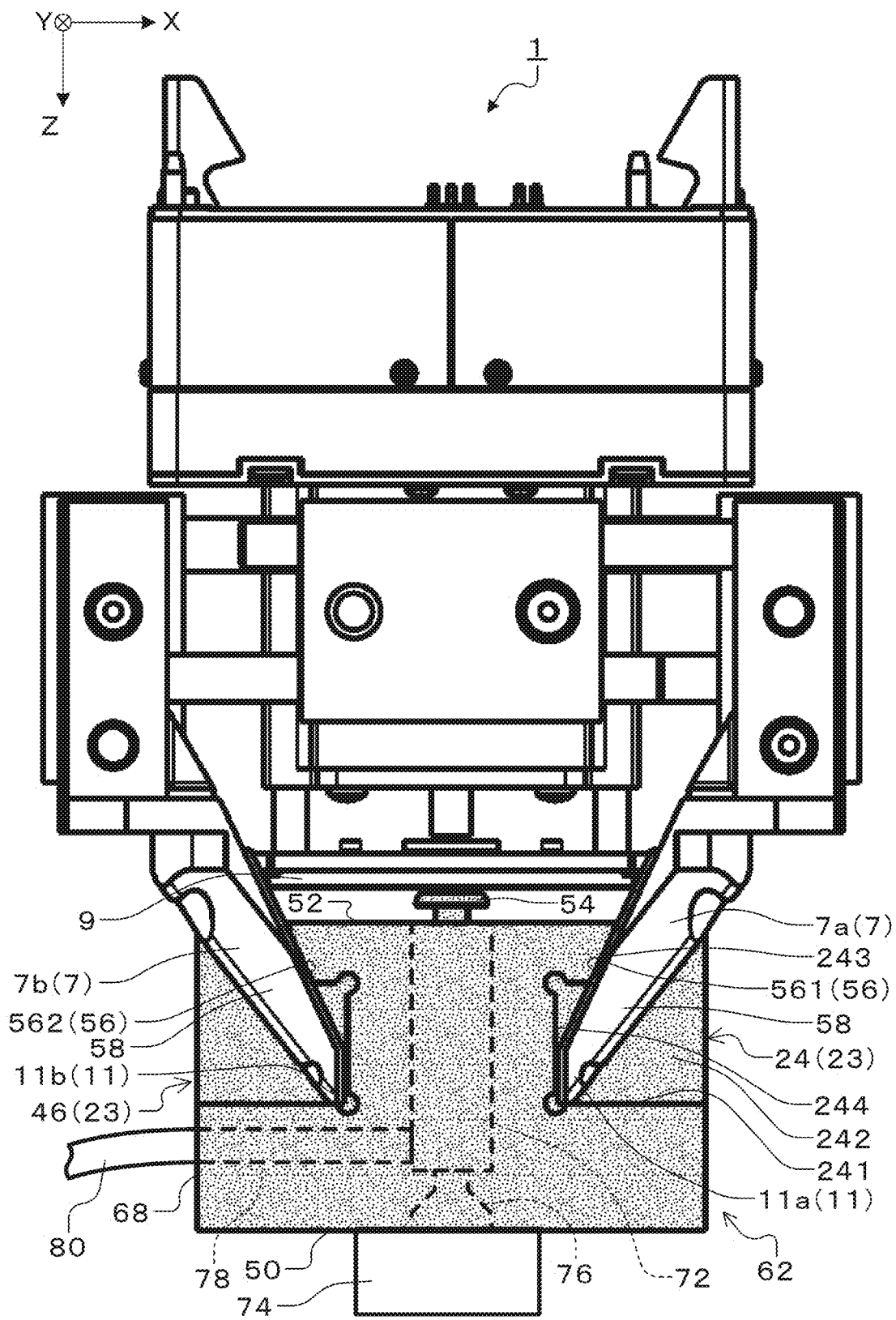
FIG. 13 is a schematic elevation showing the E-ring assembly jig and the robot hand according to the third embodiment.

For example, as shown in FIGS. 12 and 13, the E-ring assembly jig 62 may include a suction mechanism including, at the second end portion 52 of the grip section 68, the switch 54 of the valve 72 and including, at the first end portion 50 of the grip section 68, a sucking section 76 configured to suck work 74 (see FIG. 13) in vacuum.

In the sucking section 76, a suction hole 78 communicating with the end face of the grip section 68 via the switch 54 of the valve 72 is provided in the grip section 68. The terminal end of a suction tube 80 is connected to the suction hole 78. The air is sucked from the sucking section 76 through the suction tube 80. A start end of the suction tube 80 is connected to a suction source (not shown in FIGS. 12 and 13). The stage 9 is lowered (in the +Z direction), whereby the air is sucked from the sucking section 76 when the switch 54 of the valve 72 is pressed (see FIG. 13). The stage 9 is lifted (in the −Z direction) and the switch 54 of the valve 72 is released, whereby the suction of the sucking section 76 is stopped (see FIG. 12). The switch 54 of the valve 72 switches the sucking section 76 to either the suction source and the atmosphere.

Therefore, in the sucking section 76, when the switch 54 of the valve 72 is pressed and the air is sucked from the sucking section 76, the work 74 is sucked in vacuum by negative pressure.

In this embodiment, one sucking section 76 is provided. However, the sucking section 76 is not limited to this. A plurality of sucking sections 76 may be provided.

Note that the suction mechanism that sucks the work 74 may include a magnet such as an electromagnet, a simple sucking disc not connected to a pump, or an electrostatic suction mechanism that sucks the work 74 with an electrostatic force. The suction mechanism may include a gripping mechanism that grips the work 74 with a spring force.

Fourth Embodiment

A robot including the robot hand 1 in the first embodiment is explained with reference to FIG. 14.

Figure 14:
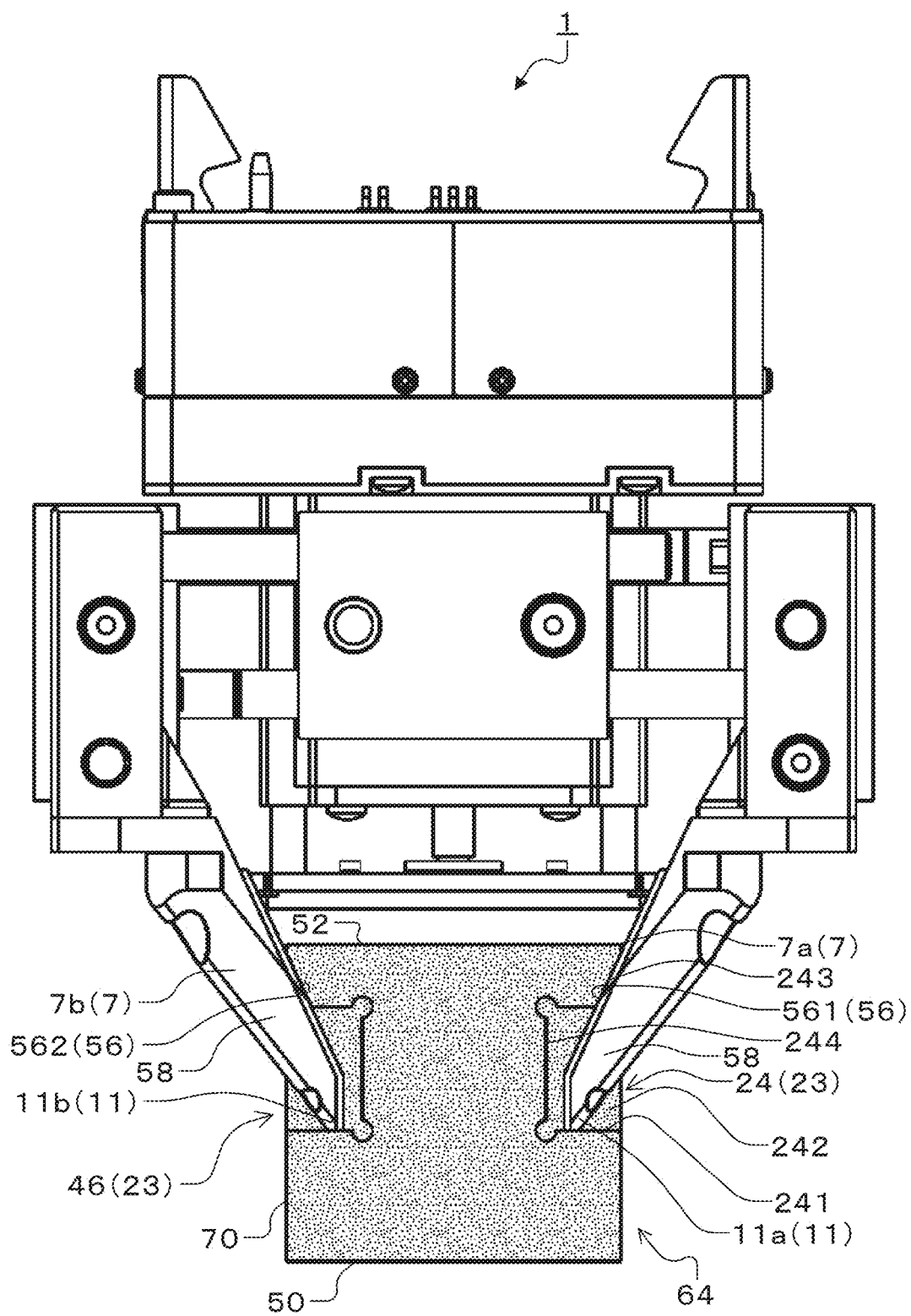
FIG. 14 is a schematic elevation showing an E-ring assembly jig and a robot hand according to a fourth embodiment.

FIG. 14 is a schematic elevation showing an E-ring assembly jig 64 and the robot hand 1 according to a fourth embodiment. Note that the E-ring assembly tool 22 is not shown in FIG. 14. The first finger section 7a, the second finger section 7b, the third finger section 7c, and the fourth finger section 7d have the same configuration. Therefore, in the following explanation, the first finger section 7a is used.

The fourth surface 244 of the first concave shape 24 of a grip section 70 functioning as a gripping section of the E-ring assembly jig 64 functioning as a robot hand jig in this embodiment is not in contact with the first fingertip section 11a as shown in FIG. 14.

The first surface 241 comes into contact with the first fingertip section 11a of the first finger section 7a. The second surface 242 and the third surface 243 come into contact with the first side surface 561 of the first finger section 7a. Accordingly, the first fingertip section 11a of the first finger section 7a of the robot hand 1 can come into contact with the first surface 241. The first side surface 561 of the first finger section 7a can come into contact with the second surface 242 and the third surface 243. Consequently, the robot hand 1 can stably grip the E-ring assembly jig 64 with three surfaces of the first concave shape 24.

When the third surface 243 is formed by drilling, a machining error occurs and a manufacturing problem occurs in that in a distal end portion of a drill and the first fingertip section 11a does not reach the fourth surface 244. However, as explained above, the third surface 243 is formed in a degree in which the fourth surface 244 is not in contact with the first fingertip section 11a. Therefore, the third surface 243 can be formed without worrying about the machining error.

Fifth Embodiment

A robot including the robot hand 1 in the first embodiment is explained with reference to FIGS. 15 and 16.

The robot according to a fifth embodiment grips the E-ring assembly jig 20 explained above and performs machining or assembly.

Figure 15:
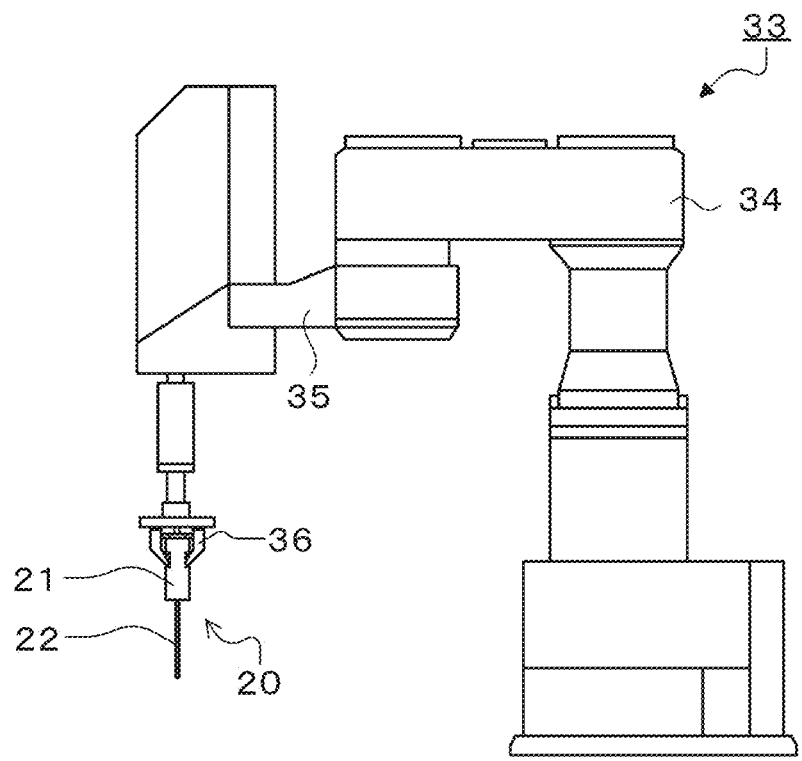
FIG. 15 is a schematic front view showing a SCARA robot according to a fifth embodiment.

FIG. 15 is a schematic front view showing a SCARA robot 33 according to this embodiment.

The SCARA robot 33 functioning as the robot includes a first arm 34 as shown in FIG. 15. A second arm 35 is set to be connected to the first arm 34. A robot hand 36 is set to be connected to the second arm 35. The SCARA robot 33 including the robot hand 36 can grip an object to be gripped. The robot hand 1 in the first embodiment is used as the robot hand 36.

Figure 16:
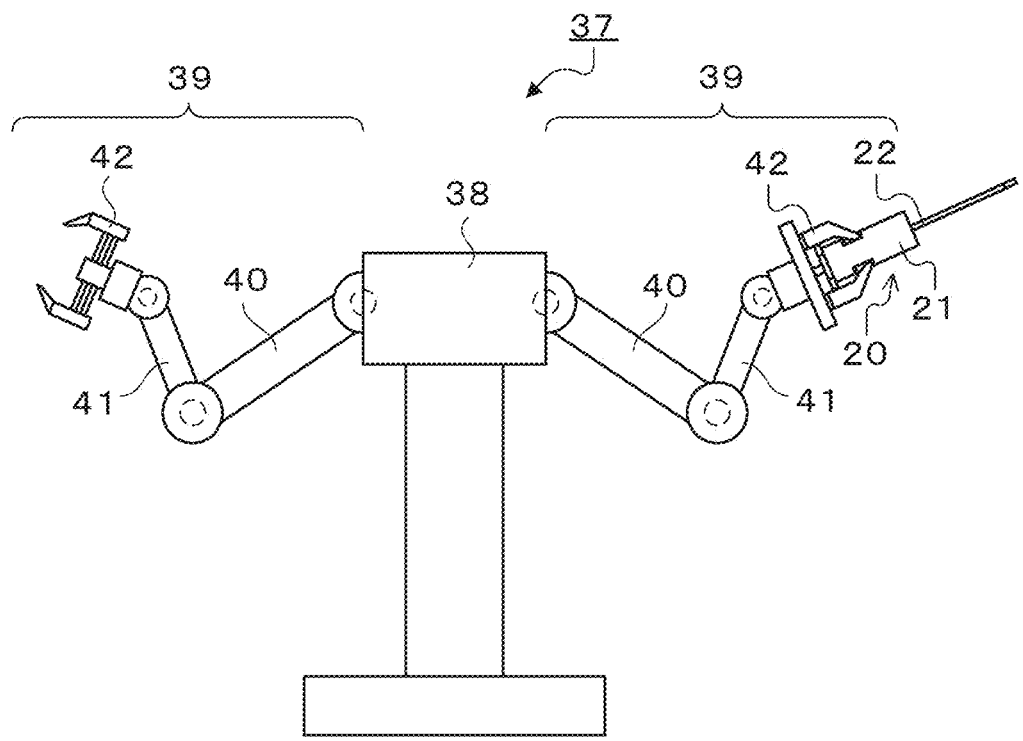
FIG. 16 is a schematic front view showing a double arm robot according to the fifth embodiment.

FIG. 16 is a schematic front view showing a double arm robot 37 according to this embodiment.

The double arm robot 37 functioning as the robot includes a main body section 38 as shown in FIG. 16. A pair of arm sections 39 are set to be connected to the main body section 38. First links 40, second links 41, and robot hands 42 are set in this order in the arm sections 39. The robot hand 1 in the first embodiment is used as the robot hand 42.

The SCARA robot 33 and the double arm robot 37 perform machining and assembly using the E-ring assembly jig 20 including the grip section 21 including the concave shapes 23 in the portions corresponding to the positions of the plurality of fingertip sections 11 and the E-ring assembly tool 22 provided at the end portion of the grip section 21.

According to this embodiment, the SCARA robot 33 and the double arm robot 37 can perform stable gripping only with the finger sections 7 of the robot hand 1 and perform additional operation (on the E-ring assembly jig 20) with the stage 9 while gripping the E-ring assembly jig 20. As a result, the SCARA robot 33 and the double arm robot 37 can contribute to diversification of work that can be performed by the robot.

Note that embodiments of the invention are not limited to the embodiments explained above. Various changes and improvements may be added to the embodiments by those having ordinary knowledge in the art within the technical idea of the invention. Modifications are explained below.

Modification 1

In the robot hand jig described in the embodiments, the gripping section (the grip sections 21, 66, 68, and 70) may have a columnar shape. A plurality of concave shapes may be present on a curved surface of the gripping section. The concave shapes may come into contact with the fingertip sections 11. Accordingly, because corner portions are not formed in the gripping section, the robot hand jig can be easily gripped. The fingertip sections 11 come into contact with the concave shapes 23 and grip the gripping section. Therefore, even in work with a large load, the robot hand jig less easily positionally deviates from the plurality of fingertip sections 11 and the plurality of side surfaces 56. The shape of the gripping section may be other shapes such as a cube, a columnar shape, an elliptical columnar shape, a polygonal prism shape, and a sphere. Note that, even when the shape of the gripping section is the other shapes, a gripping principle including the plurality of concave shapes 23 is the same.

Modification 2

In the first embodiment, the four fingertip sections 11 are set. The number of the fingertip sections 11 may be two, may be three, or may be five or more. The number of the fingertip sections 11 may be set to a number that makes it easy to grip the robot hand jig.

Modification 3

In the robot hand jig described in the embodiments, the gripping section (the grip sections 21, 66, 68, and 70) and the tool section (the E-ring assembly tool 22, the work insertion tool 28, and the work extrusion tool 30) are fixed. However, the gripping section and the tool section may be detachable from each other. Accordingly, the tool section can be replaced in a state in which the gripping section is gripped by the plurality of fingertip sections 11 and the plurality of side surfaces 56.

Modification 4

The marker 45 described in the embodiments is stuck to the first end portion 50 of the gripping section (the grip sections 21 and 66). However, the marker 45 may be provided in a desirable position where photographing of the gripping section including the marker 45 is possible.

Modification 5

The concave shape described in the embodiments only has to be a shape easily gripped by the plurality of fingertip sections. For example, a convex shape may be used instead of the concave shape.

Modification 6

In the embodiments, the E-ring assembly tool, the work insertion tool, and the work extrusion tool are explained as the examples of the tool section. However, the invention may be applied to machining or assembly tools such as a screw driver, a wrench, and a cutter other than these tools.

The jigs for robot hand and the robots in the various embodiments are explained above. However, the invention is not limited to all the embodiments and the modifications explained above. The invention can be carried out in various forms without departing from the spirit of the invention.

Content derived from the embodiments is described below.

A robot hand jig is a robot hand jig that is gripped by a robot hand including a first finger section including a first fingertip section and a first side surface, a second finger section including a second fingertip section and a second side surface, a third finger section including a third fingertip section and a third side surface, and a moving palm section and causes an object to perform predetermined action, the robot hand jig including a gripping section including a first concave section that engages with the first finger section and a second concave section that engages with the second finger section. The first concave section includes a first surface, a second surface perpendicular to the first surface, a third surface perpendicular to the second surface, and a fourth surface perpendicular to the first surface and the second surface. The second concave section includes a fifth surface, a sixth surface perpendicular to the fifth surface, a seventh surface perpendicular to the sixth surface, and an eighth surface perpendicular to the fifth surface and the sixth surface. In a plan view from a perpendicular direction of the second surface, the third surface has a portion where a distance between a point where a first imaginary surface parallel to the fourth surface and the first surface cross and a point where the first imaginary surface and the third surface cross is smaller as the first imaginary surface is closer to the fourth surface and has a portion where the distance is larger as the first imaginary surface is farther from the fourth surface. In a plan view from a perpendicular direction of the sixth surface, the seventh surface has a portion where a distance between a point where a second imaginary surface parallel to the eighth surface and the fifth surface cross and a point where the second imaginary surface and the seventh surface cross is smaller as the second imaginary surface is closer to the eighth surface and has a portion where the distance is larger as the second imaginary surface is farther from the eighth surface. When the gripping section is gripped by the robot hand, the first fingertip section comes into contact with the first surface, the second fingertip section comes into contact with the fifth surface, the first side surface comes into contact with the third surface, and the second side surface comes into contact with the seventh surface.

With the robot hand jig, when the gripping section is gripped by the robot hand, the first finger section engages in the first concave section on the first surface on one hand and on the third surface on the other. Because the first surface and the third surface are configured to be in a relation of a wedge each other, engaging loads between the first finger section and the first surface and between the first finger section and the third surface increase. The second finger section engages in the second concave section on the fifth surface on one hand and on the seventh surface on the other. Because the fifth surface and the seventh surface are configured to be in a relation of a wedge each other, engaging loads between the second finger section and the fifth surface and between the second finger section and the seventh surface increase. Consequently, the robot hand can perform stable gripping only with the first finger section and the second finger section and perform additional operation (on the robot hand jig) with the palm section while gripping the robot hand jig. As a result, the robot hand can contribute to diversification of work that can be performed by a robot.

In the robot hand jig, it is preferable that, when the gripping section is gripped by the robot hand, the first fingertip section comes into contact with the fourth surface, and the second fingertip section comes into contact with the eighth surface.

With the robot hand jig, when the gripping section is gripped by the robot hand, engaging loads between the first finger section and the fourth surface and between the second finger section and the eighth surface increase.

In the robot hand jig, it is preferable that the gripping section includes a third concave section that engages with the third finger section, the third concave section includes a ninth surface and a tenth surface perpendicular to the ninth surface, and, when the gripping section is gripped by the robot hand, the first side surface comes into contact with the second surface, the second side surface comes into contact with the sixth surface, and the third side surface comes into contact with the tenth surface.

With the robot hand jig, the third finger section of the robot hand can come into contact with the third concave section of the gripping section. Consequently, the robot hand can stably grip the robot hand jig.

In the robot hand jig, it is preferable that, when the gripping section is gripped by the robot hand, the third fingertip section comes into contact with the ninth surface.

With the robot hand jig, the robot hand can increase positioning accuracy by bringing the third fingertip section into contact with the ninth surface.

In the robot hand jig, it is preferable that the gripping section includes a tool section configured to cause the object to perform the predetermined action.

With the robot hand jig, the robot hand can perform stable gripping only with the finger sections and perform operation of the operation section with the palm section while gripping the robot hand jig. As a result, the robot hand can contribute to diversification of work that can be performed by the robot.

In the robot hand jig, it is preferable that the gripping section includes a switch for operating the tool section and, when the gripping section is gripped by the robot hand, the switch is located between the palm section and the gripping section, and the switch is pressed by the palm section.

With the robot hand jig, the robot hand can perform stable gripping only with the finger sections and perform operation of the switch of a valve with the palm section while gripping the robot hand jig. As a result, the robot hand can contribute to diversification of work that can be performed by the robot.

A robot grips the robot hand jig.

With the robot, the robot can perform stable gripping only with the finger sections of the robot hand and perform additional operation (on the robot hand jig) with the palm section while gripping the robot hand jig. As a result the robot can contribute to diversification of work that can be performed by the robot.

The entire disclosures of Japanese Patent Application No. 2017-160891 filed Aug. 24, 2017 and Japanese Patent Application No. 2018-110205 filed Jun. 8, 2018 are incorporated by reference.

What is claimed is:

1. A robot hand jig that is gripped by a robot hand including a first finger including a first fingertip and a first side surface, a second finger including a second fingertip and a second side surface, a third finger including a third fingertip and a third side surface, and a moving palm and causes an object to perform predetermined action, the robot hand jig comprising a grip including a first depression configured to engage with the first finger and a second depression configured to engage with the second finger, wherein
the first depression includes:
  a first surface;
  a second surface perpendicular to the first surface;
  a third surface perpendicular to the second surface; and
  a fourth surface perpendicular to the first surface and the second surface,
the second depression includes:
  a fifth surface;
  a sixth surface perpendicular to the fifth surface;
  a seventh surface perpendicular to the sixth surface; and
  an eighth surface perpendicular to the fifth surface and the sixth surface,
in a plan view from a perpendicular direction of the second surface, a distance between a point where a first imaginary surface parallel to the fourth surface and the first surface cross and a point where the first imaginary surface and the third surface cross is smaller as the first imaginary surface is closer to the fourth surface and the distance is larger as the first imaginary surface is farther from the fourth surface,
in a plan view from a perpendicular direction of the sixth surface, a distance between a point where a second imaginary surface parallel to the eighth surface and the fifth surface cross and a point where the second imaginary surface and the seventh surface cross is smaller as the second imaginary surface is closer to the eighth surface and the distance is larger as the second imaginary surface is farther from the eighth surface, and
when the grip is gripped by the robot hand, the first fingertip comes into contact with the first surface, the second fingertip comes into contact with the fifth surface, the first side surface comes into contact with the third surface, and the second side surface comes into contact with the seventh surface.

2. The robot hand jig according to claim 1, wherein, when the grip is gripped by the robot hand, the first fingertip comes into contact with the fourth surface, and the second fingertip comes into contact with the eighth surface.

3. The robot hand jig according to claim 1, wherein
the grip includes a third depression configured to engage with the third finger,
the third depression includes:
  a ninth surface; and
  a tenth surface perpendicular to the ninth surface, and
when the grip is gripped by the robot hand, the first side surface comes into contact with the second surface, the second side surface comes into contact with the sixth surface, and the third side surface comes into contact with the tenth surface.

4. The robot hand jig according to claim 3, wherein, when the grip is gripped by the robot hand, the third fingertip comes into contact with the ninth surface.

5. The robot hand jig according to claim 1, wherein the grip includes a tool configured to cause the object to perform the predetermined action.

6. The robot hand jig according to claim 5, wherein
the grip includes a switch for operating the tool, and
when the grip is gripped by the robot hand, the switch is located between the palm and the grip, and the switch is pressed by the palm.

7. A robot that grips a robot hand jig, wherein,
the robot hand jig that is gripped by the robot including a first finger including a first fingertip and a first side surface, a second finger including a second fingertip and a second side surface, a third finger including a third fingertip and a third side surface, and a moving palm and causes an object to perform predetermined action, the robot hand jig comprising a grip including a first depression configured to engage with the first finger and a second depression configured to engage with the second finger, wherein
the first depression includes:
  a first surface;
  a second surface perpendicular to the first surface;
  a third surface perpendicular to the second surface; and
  a fourth surface perpendicular to the first surface and the second surface,
the second depression includes:
  a fifth surface;
  a sixth surface perpendicular to the fifth surface;
  a seventh surface perpendicular to the sixth surface; and
  an eighth surface perpendicular to the fifth surface and the sixth surface,
in a plan view from a perpendicular direction of the second surface, a distance between a point where a first imaginary surface parallel to the fourth surface and the first surface cross and a point where the first imaginary surface and the third surface cross is smaller as the first imaginary surface is closer to the fourth surface and the distance is larger as the first imaginary surface is farther from the fourth surface, in a plan view from a perpendicular direction of the sixth surface, a distance between a point where a second imaginary surface parallel to the eighth surface and the fifth surface cross and a point where the second imaginary surface and the seventh surface cross is smaller as the second imaginary surface is closer to the eighth surface and the distance is larger as the second imaginary surface is farther from the eighth surface, and when the robot grips the grip, the first fingertip comes into contact with the first surface, the second fingertip comes into contact with the fifth surface, the first side surface comes into contact with the third surface, and the second side surface comes into contact with the seventh surface.

8. The robot according to claim 7, wherein, when the robot grips the grip, the first fingertip comes into contact with the fourth surface, and the second fingertip comes into contact with the eighth surface.

9. The robot according to claim 7, wherein the grip includes a third depression configured to engage with the third finger, the third depression includes:

a ninth surface; and a tenth surface perpendicular to the ninth surface, and when the robot grips the grip, the first side surface comes into contact with the second surface, the second side surface comes into contact with the sixth surface, and the third side surface comes into contact with the tenth surface.

10. The robot according to claim 9, wherein, when the robot grips the grip, the third fingertip comes into contact with the ninth surface.

11. The robot according to claim 7, wherein the grip includes a tool configured to cause the object to perform the predetermined action.

12. The robot according to claim 11, wherein the grip includes a switch for operating the tool, and when the robot grips the grip, the switch is located between the palm and the grip, and the switch is pressed by the palm.

* * * * *